United States Patent

[11] 3,565,275

[72] Inventors Yoshimitsu Uto;
 Yasuhiro Iwasaki, Hiroshima-shi, Japan
[21] Appl. No. 671,829
[22] Filed Sept. 29, 1967
[45] Patented Feb. 23, 1971
[73] Assignee Mitsubishi Jukogyo Kabushiki Kaisha
 Tokyo, Japan
[32] Priority Oct. 6, 1966
[33] Japan
[31] 41/65789

[54] HYDROGEN EMBRITTLEMENT-PROOF VESSEL OF LAYER
 3 Claims, 5 Drawing Figs.
[52] U.S. Cl. .................................................. 220/3, 220/63
[51] Int. Cl. ..................................................... B65d 7/42, B65d 25/00; F17c 1/10
[50] Field of Search ....................................... 220/3, 83; 29/148.2, 471.1, 471.3; 23/289, 290

[56] References Cited
UNITED STATES PATENTS
2,164,074  6/1939  Moses et al. ................. 29/471.3
2,243,240  5/1941  Zerbe ........................... 220/3X
2,943,387  7/1960  Dawson ........................ 29/471.1
3,224,619  12/1965 Maurin et al. ................. 220/3
3,231,338  1/1966  Andrus ......................... 220/3X Primary Examiner—Raphael H. Schwartz
Attorney—McGlew & Toren ABSTRACT: A multilayered pressure vessel for handling hydrogen gas wherein the inner layer of the vessel is formed of a material resistant to hydrogen embrittlement. Individual sections of the inner layer and of the outer layers are welded together at circular joints. The welded joint for the inner layer is formed of a material which is resistant to hydrogen embrittlement, however, the weld material joining the outer layers is not resistant to hydrogen embrittlement. In constructing the vessel the welded joints securing the outer layers are displaced from and are out of contact with the welded joint securing the individual sections of the inner layer. Additionally, outlet holes extend from the outer surface of the vessel through each of the outer layers to the outer surface of the inner layer. The outlet holes are located in the area adjacent the welded joint securing the individual sections of the outer layers. Where the inner layer is secured to the outer layers as the final step in constructing the pressure vessel, a hole is bored through the innermost of the outer layers extending from the outer surface of the inner layer to the inner surface of the next outer layer. Further, where a solid flange member is secured at one or both ends of the vessel the welded joint securing the flange to the inner layer and the welded joint securing the flange to the outer layers are spaced from one another so that they are not in contact and outlet holes are provided in the region of the welded joint securing the flange to the outer layers. In the outlet holes hydrogen gas at the interface between the inner layer and the innermost of the outer layers is prevented from diffusing into the deposited metal and the outer layers of the vessel are protected from failures due to hydrogen embrittlement.

INVENTORS
YOSHIMUTSI UTO
YASUHIRO IWASAKI

INVENTOR.
YOSHIMITSU UTO
YASUHIRO IWASAKI

By MarkGlaw and Toren
ATTORNEYS

HYDROGEN EMBRITTLEMENT-PROOF VESSEL OF LAYER

SUMMARY OF THE INVENTION

This invention relates to a hydrogen embrittlement-proof vessel built up of layers capable of preventing failures such as hair cracks, decarbonization, embrittlement, etc. due to the hydrogen at high temperature and under high pressure.

There will be no problems in preventing hydrogen embrittlement if all steel materials for a high-pressure vessel for handling hydrogen gas at high-pressure and high temperature are alloyed steels for hydrogen-proof purposes which withstand a given working condition. These hydrogen-proof steels, however, are expensive and require a high degree of technical skill in working such as heat-treatment, welding, etc., thus raising manufacturing costs in final calculation. In view of the above fact, if only the inner cylinder of a layer-built high-pressure vessel is made of a hydrogen-proof steel and the layer plates constructing the layers wrapped around the inner cylinder can be made of inexpensive steels like carbon steel, the manufacturing cost of the vessel will be greatly reduced, bringing about effective results.

This invention aims at providing an inexpensive hydrogen embrittlement-proof vessel of which there is no possibility to cause hydrogen embrittlement as mentioned above.

Furthermore, this invention aims at providing hydrogen embrittlement-proof layer-built vessels to prevent hydrogen diffusion into the steel plates forming the layers by designing a particular gas flow hole in the layers constructing the layer-built vessel or the deposit-metal-forming circular welded joint, accordingly, inexpensive layer-built vessels protected against hydrogen embrittlement comprising ordinary steels except the use of hydrogen-proof steel for an inner cylinder and a solid flange.

Another object of this invention is to provide layer-built vessels preventing the diffusion of hydrogen and hydrogen embrittlement by means of special welding procedure of circular welded joints applying a pad metal.

Embodiments of this invention are explained referring to drawings, wherein.

Figure 1:
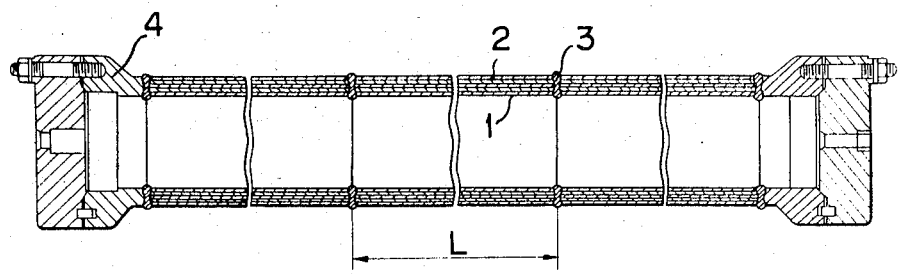
FIG. 1 is a cross section in the axial direction of a conventional high-presssure vessel built up of layers.
Figure 2:
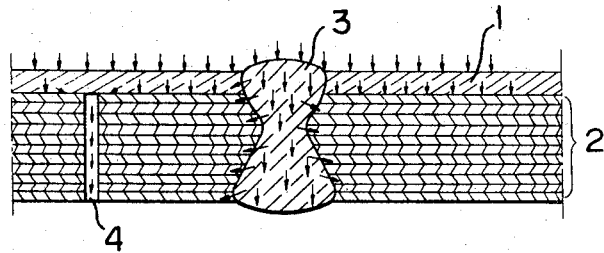
FIG. 2 is a view showing a welded joint on the circumference of the high-pressure vessel built up of layers shown in FIG. 1.

Referring to FIG. 1, a unit cylinder block (indicated by L in FIG. 1) which has many layer plates 2 wrapped around the inner cylinder 1 of a layer-type high-pressure vessel is usually connected with each other or a flange 4 with a circular welded joint 4 as shown in FIG. 1. Consequently, even if an inner cylinder or a flange made up with forged or thick steel plate is made of a hydrogen-proof steel and a welding rod to be used is made of hydrogen-proof steel, there is a possibility that hydrogen is absorbed during operation in the welded metal from the surfaces exposed on the interior surface of a vessel, and the hydrogen reaches to the steel plates constructing the layer portion from the said welded metal causing the failure due to hydrogen, unless the steels forming the layer are also made of hydrogen-proof steels. This phenomenon will be explained further in detail referring to FIG. 2. The numeral 1 indicates an inner cylinder of a hydrogen-proof steel, 2 a layer portion comprising many carbon steel plates, 3 deposited metal in a circular joint, and 4 a detection or alarm hole. A part of hydrogen is absorbed from the steel surface forming the vessel and diffuses into the interior of the steel in the form of atomic hydrogen. The hydrogen absorbed from the surface of an inner cylinder 1 pierces through the inner cylinder 1, precipitates in the interspace between the inner cylinder 1 and the layers 2, and flows out of a detection hole 4 as shown by arrowheads in FIG. 2. The pressure at the interspace open to atmosphere does not exceed the atmospheric pressure and does not cause failure due to hydrogen on the steel plates forming the layer portion at the positions far from the weld 3. However, the hydrogen absorbed from the surface of a deposit metal 3 partly precipitates in the atmosphere piercing through a thickness of deposited metal, but also partly diffuses into each steel plates constructing the layers 2; it is necessary therefore to use a hydrogen-proof steel for the deposit metal 3 and the layer portion 2 which are formed by the steel plates in order to prevent hydrogen failure at the neighborhood of welded joints. This is undesirable however, considering the rise of manufacturing cost as mentioned earlier.

Figure 3:
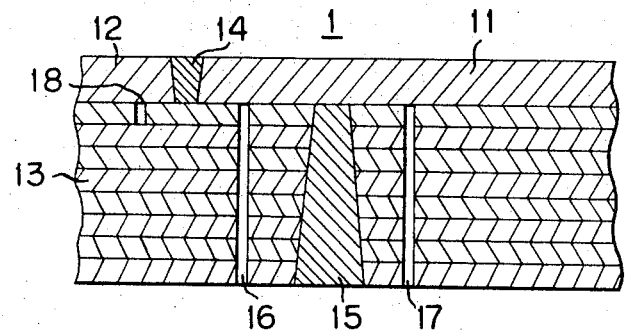
FIGS. 3 and 4 are views showing welded joints on the circumference of a high-pressure vessel built up of layers and embodying this invention.

FIG. 3 is a cross section illustrating an example of a joint of a layer of a layer-built high pressure vessel welded to another layer; 11 and 12 are inner cylinders of a hydrogen-proof steel, 13 is a layer portion of many carbon steel plates, 14 is a hydrogen-proof deposited metal forming a circular weld joint of an inner cylinder, and 15 is a deposit metal of carbon steel forming a circular welded joint of the layers. 16 and 17 are outlets of hydrogen gas flow piercing through the layer portion, serving also as a detecting hole.

Furthermore, 18 is an outlet of hydrogen gas flow bored on the side of the innermost layer of the layered portion where there is no hydrogen gas outlet piercing through the layered portion between the circular welded joints. If hydrogen under high pressure and at high temperature is present in this vessel 1, this hydrogen atom is absorbed first from cylinders 11 and 12 consisting of hydrogen-proof steel plates and the deposited metal 14 and then diffuses through the above-mentioned parts to reprecipitate in the form of hydrogen gas in the interspace between the inner cylinders 11 and 12 and the layered portion 13. The pressure in this interspace is so maintained at the atmospheric pressure by means of outlets 16 and 17 that the partial pressure of hydrogen in this interspace does not exceed the atmospheric pressure and the hydrogen does not diffuse into the deposited metal. The layered portion 13 is also perfectly protected from failures due to hydrogen. The outlets of hydrogen gas may be located anywhere in the neighborhood of the deposited metal 15 of the layered portion 13 and may be provided directly in the deposit metal 15 if an occasion arises.

As to the effect of outlets 18 of hydrogen gas, the following comment is useful. As the position of a circular welded joint 14 of inner cylinders 11 and 12 does not coincide with that of the circular welded joint 15 of the layer portion, there is a possibility of accomplishing welding of the inner cylinder after assemblage of layer-built vessel; in which case the inner cylinder is welded to the innermost layer of the layer portion and the hydrogen at that area is absorbed and diffuses into the layer portion of carbon steel plates to cause embrittlement unless there is an outlet 18 for hydrogen gas. Accordingly an outlet 18 for hydrogen gas is bored solely in one layer to facilitate escaping of hydrogen gas to atmosphere by communication with a hydrogen gas outlet 16 utilizing the space formed between the next layer.

Figure 4:
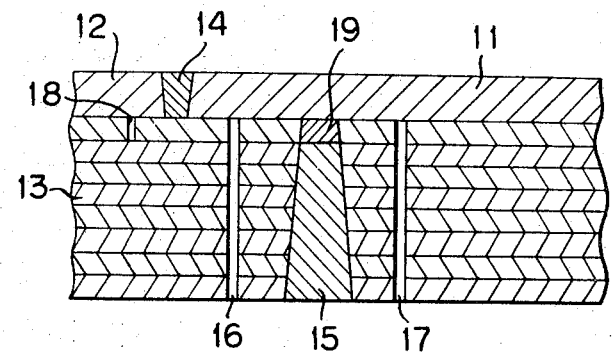

It is necessary to so weld one of the layers to another that it is not welded into an inner cylinder 11 on welding; if it is difficult to do so, it is recommended to use a pad metal 19 thicker than the depth of welding penetration on the portion adjacent to the inner cylinder as shown in FIG. 4. The same marks in FIG. 4 as in FIG. 3 indicates the same parts.

Since this joint is a circular welded joint and the stress exerted axially is half as much as that exerted circumferentially when an internal pressure is applied, it may be said that one-half thickness is sufficient if perfectly welded; accordingly, there will be no problem as far as strength is concerned, if a pad metal is used as mentioned before.

Figure 5:
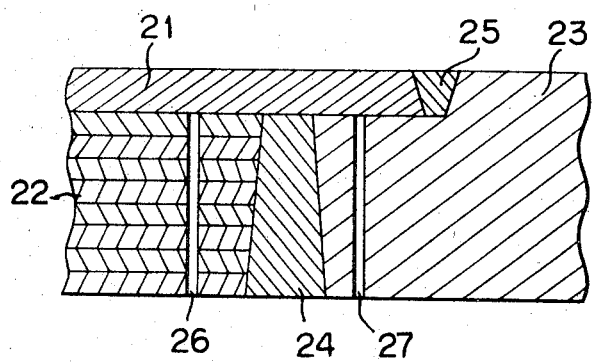
FIG. 5 is a cross section showing the joint of a layer portion with a solid flange.

FIG. 5 shows a joint between a layer portion and a solid flange; 21 is an inner cylinder of hydrogen-proof steel, 22 the layer portion consisting of many carbon steel plates, 23 a flange of hydrogen-proof steel forging or thick steel plate, 24 deposit of carbon steel, 25 is made up of the deposit of hydrogen-proof steel and connects the inner cylinder 21 to the flange of forging or thick steel plate, 26 an outlet of hydrogen gas piercing through the layer portion and the inner cylinder, and 27 indicates an outlet of hydrogen gas piercing through a solid flange. In this embodiment too, as explained in FIG. 3, the hydrogen coming through the inner cylinder 21 diffuses into the atmosphere through the hydrogen gas outlet 26 by way of minute interspaces between the inner cylinder 21 and the layer portion 22, leaving no possibility of hydrogen embrittlement on the layer portion 22, leaving no possibility of hydrogen embrittlement on the layer portion consisting of carbon steel.

The hydrogen having diffused through the solid flange 23 or the part of the inner cylinder overlapping the solid flange is freed into atmosphere through the hydrogen gas outlet 27 bored in the solid flange before it reaches to the deposit of carbon steel; this accounts for the use of carbon steel as the deposited metal.

A pad metal may be applied in consideration of weld penetration of the deposit metal 24 into the inner cylinder in a welding procedure explained in FIG. 3.

In the FIGS. 1, 2, 3, 4, and 5, carbon steel or ordinary steel is mentioned for simplicity of explanation, but low-alloy steel or high-tensile steel less resistant hydrogen may be used.

The hydrogen-proof steel mentioned here refers to the steel which is prevented from or reduced of the damages caused by the hydrogen at high-pressure and high temperature by addition of chromium and/or molybdenum and further by adding alloying element such as tungsten, titanium, vanadium, zirconium, niobium, etc. if the circumstance demands.

As explained above in concrete based on embodiment of this invention, a vessel of layer construction of this invention consists of an inner cylinder of hydrogen-proof steel and layer plates wound up in a plurality of layers to form a layered portion; the both ends of the inner cylinder and the layer portion are with flanges, the circular welded joint formed between layer portions or between the solid flange and the layer portion does not coincide in relative position with the circular welded joints between the inner cylinders and a gas flow outlet which pierces through the layer portion or the area where the solid flange overlaps the inner cylinder is provided between the layer portion, or at the welded joint between the layer portion and the solid flange or at its neighborhood, and a gas outlet is provided in the innermost layer of the layered portion and on the opposite side of said gas outlet with respect to the weld of inner cylinders; by providing those gas outlets, the hydrogen gas passing through an inner cylinder from inside the vessel is drawn off into the atmosphere through gas outlets, and it does not diffuse into the layer plates which form the layered portion. A gas outlet which is provided on the opposite side of a gas-detecting hole with respect to the weld between the inner cylinders is sufficient for its purpose if it pierces only the innermost layer, but it may pierce two or more inner layers. The deposited metal forming the circular welded joint of the layered portion can communicate with the atmosphere by way of gas outlets by combined use of a welding procedure to eliminate the weld penetration into the inner cylinder; accordingly, the hydrogen gas does not diffuse into the deposited metal but is expelled to the atmosphere; nor does the hydrogen diffuse from the deposited metal to the layer plates. Consequently, only the inner cylinder and solid flange must be of a steel resistant to hydrogen embrittlement and other parts may be made of ordinary steel, thus making a hydrogen embrittlement-proof vessel less expensive.

Furthermore, the present invention provides, in addition to the above, a means to insert a pad metal thicker than the depth of welding penetration occuring in a welding procedure outside an inner cylinder and in the circular welded joint between layer portions or between a layered portion and a solid flange, thus preventing the welding penetration into the inner cylinder in a welding procedure of the weld between layer portions.

We claim:

1. A multilayered vessel construction arranged to avoid hydrogen embrittlement comprising an inner layer forming the interior surface of the vessel, said inner layer formed of a material resistant to hydrogen embrittlement, said inner layer formed of separate cylindrically-shaped monolithic circumferentially endless wall sections integrally joined together by circumferentially extending welded joints, said inner layer being of a single thickness for its axial length, said welded joints formed of a material resistant to hydrogen embrittlement, a multiplicity of concentrically arranged contacting outer layers disposed about said inner layer and with the inner surface of the innermost outer layer being in contact with the outer surface of said inner layer, said outer layers formed of a material not resistant to hydrogen embrittlement, said outer layers formed of separate cylindrically-shaped circumferentially endless sections integrally joined together by circumferentially extending welded joints, said welded joints securing said sections of said outer layers together being spaced in the axial direction of the vessel from and out of contact with said welded joints securing the sections of said inner layer together, an outlet hole formed through said outer layers on each side of said welded joints which secure said cylindrically-shaped outer layers together and the inner end of said outlet holes terminating at and communicating with the outer surface of said inner layer and extending therefrom to the outer surface of the vessel, each of said outlet holes being located adjacent the welded joints securing the sections of said outer layers together and the adjacent welded joint securing said inner layer sections together, and a second outlet hole being formed through at least the innermost outer layer communicating with the outer surface of said inner layer, said second outlet hole being located on the opposite side of the welded joint between said inner layer section from said outer hole extending to the outer surface of said vessel.

2. A multilayered vessel, as set forth in claim 1, wherein a solid flange member is secured to at least one end of said vessel, said monolithically formed inner layer of said vessel and said flange integrally secured together by a circumferentially extending welded joint formed of a weld material resistant to hydrogen embrittlement, said outer layers of said vessel integrally secured to said solid flange by a circumferentially extending welded joint formed of material not resistant to hydrogen embrittlement, said welded joint securing said outer layers and said solid flange together spaced in an axial direction of said vessel from and out of contact with the welded joint securing said inner layer and said solid flange together, and an outlet hole formed on each side of said circumferentially extending welded joint securing said outer layer to said flange member, said outlet holes extending from the outer surface of said vessel inwardly to the outer surface of said inner layer with one said outlet hole extending through said outer layers and the other said outlet hole extending through said flange member.

3. A multilayered vessel construction arranged to avoid hydrogen embrittlement comprising an inner layer forming the interior surface of the vessel, said inner layer formed of a material resistant to hydrogen embrittlement, said inner layer formed of separate cylindrically-shaped monolithic circumferentially endless wall sections integrally joined together by circumferentially extending welded joints, said inner layer being of a single thickness for its axial length, said welded joints formed of a material resistant to hydrogen embrittlement, a multiplicity of concentrically arranged contacting outer layers disposed about said inner layer and with the inner surface of the innermost outer layer being in contact with the outer surface of said inner layer, said outer layers formed of a material not resistant to hydrogen embrittlement, said outer layers formed of separate cylindrically-shaped circumferentially endless sections integrally joined together by circumferentially extending welded joints, said welded joints securing said sections of said outer layers together being spaced in the axial direction of the vessel from an out of contact with said welded joints securing the sections of said inner layer together, an outlet hole formed through said outer layers on each side of said welded joints which secure said cylindrically-shaped outer layers together and the inner end of said outlet holes terminating at and communicating with the outer surface of the vessel each of said outlet holes being located adjacent the welded joints securing the sections of said outer layers together and the adjacent welded joint securing said inner layer sections together, a second outlet hole being formed through at least the innermost outer layer communicating with the outer surface of said inner layer, said second outlet hole being located on the opposite side of the welded joint between said inner layer section from said outer hole extending to the outer surface of said vessel, and a pad of welding material being inserted between the sections forming the innermost layer of said outer layers and in contact with the outer surface of said inner layer, the dimension of said pad of material is greater in the direction between the adjoining sections of said innermost layer which it joins than in the direction of the thickness of the sections which it separates.